INVENTORS
WILLIAM LEE GILL &
HAROLD PERKEL
BY
ATTORNEY

INVENTORS
WILLIAM LEE GILL &
HAROLD PERKEL
BY Edward J. Norton
ATTORNEY

United States Patent Office 3,427,453
Patented Feb. 11, 1969

3,427,453
SYSTEM FOR SWITCHING THE ATTITUDE REFERENCE OF A SATELLITE FROM A FIRST CELESTIAL BODY TO A SECOND CELESTIAL BODY
William Lee Gill, Trenton, N.J., and Harold Perkel, Levittown, Pa., assignors to Radio Corporation of America, a corporation of Delaware
Filed May 25, 1966, Ser. No. 552,942
U.S. Cl. 250—83.3     5 Claims
Int. Cl. G01b 15/00; G01t 1/16; B64d 43/00

ABSTRACT OF THE DISCLOSURE

Logic circuitry is employed to switch attitude reference from one reference celestial body to another when an interfering signal, such as the direct rays of the sun, appears within an area defined by an electrical condition of the logic circuitry. Means are provided for compensating for the known positional difference between the first and the second reference celestial bodies. After a predetermined time the control circuitry switches back to the first or primary reference celestial body.

---

This invention relates to a multi-reference, attitude control system, and more particularly to an apparatus for developing attitude control information for a spacecraft or other vehicle when there is interference with the normal operation of an attitude sensor aboard the vehicle.

Within recent times, spacecrafts or satellites have been placed in orbit about a focal parent body. These crafts have observed weather conditions, relayed radio and television signals and in general service as valuable communications links. In order for a spacecraft to better perform as a communications link, it is necessary to stabilize the attitude or angular position of such a craft with respect to a reference celestial body such as the earth. This may also be desirable for a spacecraft orbiting another body such as the moon, sun, mars, and so on. By way of example, such stabilization techniques allow greater capability of positioning directive antennas with respect to the reference celestial body, and consequently can serve to reduce the weight and complexity of the spacecraft's equipment including, for example, the transmitter, receiver, and power supplies. In order to obtain information to control the attitude of the spacecraft, sensors are used in the spacecraft. These sensors, which may be light, heat, or magnetic field sensitive, are utilized to determine the horizontal and vertical positions of the spacecraft with reference to the celestial body about which the craft is orbiting or with reference to a celestial body whose position with respect to the spacecraft is accurately known. The information furnished by these sensors is used in maintaining a particular axis or particular axis of the vehicle oriented in a specified direction with respect to a set of axes fixed at the geometric center of the focal body which the craft is orbiting about or at some angle to the horizon of the focal body or perhaps towards the center of gravity of the focal body. In any case the problem is one of accurately controlling the relative position of the craft so that the pointing of the spacecraft's antennas, for example, can be accurately controlled.

Certain satellites use radiant energy sensors. These sensor are usually fabricated from thermistors arranged in bridge configurations and are commonly referred to as bolometers. In one application the sensors are caused to scan the horizon of a reference celestial body such as the earth and the correspondingly small portion of space adjacent to the body. The information obtained from one of a group of such sensors, each of which may be scanning different portions of the reference body's horizon, is used to stabilize the vehicle in a preferred axis such as the vertical axis or the horizontal axis. However, in certain prior art systems it has been noted that at specific times in the orbit the sensor's field of view can intercept a source of interference. For instance, a horizon sensor's field of view can intercept the sun which temporarily renders the information from the horizon sensor useless in determining the correct orientation for the spacecraft. The horizon sensor during such conditions becomes saturated because of the broad energy spectrum emanating from the sun. During this condition of saturation the horizon sensor requires a finite time to recover from the exposure to this concentration of energy. Hence during the saturation and recovery time of the sensor an attitude error is developed, and as the spacecraft continues in orbit this error may be multiplied during each orbital revolution until an excessively large error in attitude is developed which eventually may render the craft useless for its original mission. There are other examples where sensors might be interfered with while they are viewing a reference point. This may be due to so called magnetic or electrical storms interfering with magnetic sensors, sunspots interfering with electrical sensors, and so on.

Accordingly, it is an object of the present invention to provide an improved attitude sensing the control apparatus.

A further object is to provide an attitude sensing and control apparatus unaffected by external interference.

Still a further object is to provide an attitude sensing and control apparatus unaffected by sun saturation.

Another object is to provide an improved sensing system which is controlled by logic circuitry to eliminate interference.

Still another object is to provide an improved attitude control system capable of automatically switching from a first reference, which is interfered with, to an alternate second reference.

These and other objects are achieved in one embodiment of the invention by employing logic circuitry to switch an attitude reference from a first celestial body to a second celestial body, when an interfering signal appears within an area or window defined by an electrical condition of the logic circuitry. When the interfering signal appears in this window for a certain duration, the reference to the attitude control system is switched from the first celecstial body's reference sensor to a reference sensor capable of responding to information emanating from a second reference celestial body, and at the same time a counter or a timing circuit is activated to compensate for the known positional difference between the first and the second celestial bodies. When this counter reaches a predetermined count and the interference signal is no longer present within the window, the control circuitry switches back to the first or primary reference celestial body.

For a more detailed understanding of the present invention reference will now be made to the following description taken in conjunction with the accompanying drawings in which.

Figure 1:
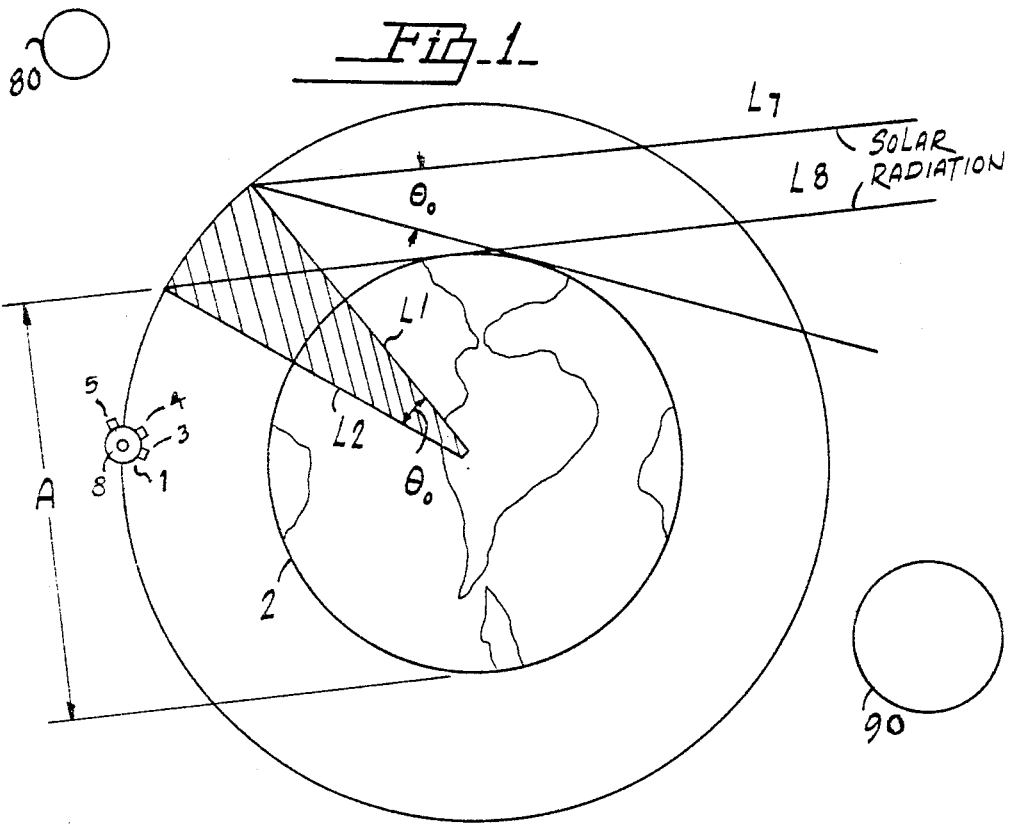
FIGURE 1 is an illustration showing an orbit of a satellite about a celestial body and an example of the orbital region where the invention operates.

In FIGURE 1 there is schematically shown a spacecraft or satellite 1 in the vicinity of the reference celestial body 2. The celestial body 2 would be the parent body and the spacecraft 1 would be a satellite in orbit about parent celestial body 2. In this manner, parent body means the body being orbited by the spacecraft 1, not necessarily the celestial body from which the space vehicle 1 originated. Hence while the parent celestial body may be the Earth it may also be the Moon, Mars, and so on. The scale of the space vehicle 1 is greatly exaggerated as compared to the scale of the parent celestial body 2 for purposes of clarity. The spacecraft 1 includes smaller elements such as 3, 4, 5, and 8 which are used to derive attitude reference information from either the horizon of the celestial body 2 or from some other remote celestial body such as 80 or 90. Sensor 3 or 4 may be horizon sensors and as such they would be caused to scan the horizon of celestial body 2, together with a portion of the space above celestial body 2. The sensor 3 or 4 as employed in present spacecraft might be radiant energy type sensors and hence would be affected by light or heat emanating from celestial body 2. As the spacecraft 1 traverses its orbit, shown by the large circle surrounding the celestial body 2, there are various positions it can assume in relation to a heat emitting source such as the sun or some other source of interference. In FIGURE 1 there are shown two lines L7 and L8 labelled as solar radiation, to indicate the direction of the source, such as the sun, from where solar radiation emanates. As the spacecraft 1 orbits celestial body 2, it will enter the cross hatched area shown on FIGURE 1 and represented by two orbital radii L1 and L2 drawn from the geometric center of the celestial body 2 and having an angle $\theta_0$ separating them. The angle $\theta_0$ is also found by geometry to be the angle included by the line intersecting the orbital path of spacecraft 1 due to the solar radiation line L7 and the line drawn from this point of intersection tangential to the outer surface of the celestial body 2 as shown in the figure. When the spacecraft 1 enters the cross hatched portion of the orbit the sensors 3 and 4 would be directly viewing the sun. This is so because the sensors would be scanning the celestial body 2's horizon and a portion of this space above the horizon. However, this portion would be covered by the sun. This causes sensors 3 and 4 to become saturated and therefore incapable of providing the accurate signals necessary for stabilization. Under this condition the spacecraft 1 could develop excessively large attitude errors due to the solar radiation interference. It can be seen from the figure that for other locations of the spacecraft 1 in orbit such as the portion of the orbit denoted as A, the sensors 3 and 4 do not see this radiation as it is blocked from view by the celestial body 2. While for the remainder of the orbital path the source of solar radiation is well above the horizon of the celestial body 2 and hence for all practical purposes the sun would not be within the view of the sensors 3 and 4. To avoid the difficulty of saturating attitude sensors in certain critical portions of the orbit, this invention automatically determines when the interference portion of the orbit is reached and serves to switch the attitude sensors from those based on the horizon scanning technique to those which will derive signals directly from the source of solar radiation or some other reference celestial body as 80 or 90. Further, when the spacecraft has moved in orbit so that it is either in that portion defined by A or that portion of orbit where the source of solar radiation would be several degrees above the celestial body 2's horizon and therefore not cause any detrimental saturation of the sensors 3 and 4, then the invention causes an automatic transfer back to the sensors 3 and 4.

It is noted that the spacecraft contains other sensors, for example 5 and 8. These sensors may be devices which respond to the presence of a magnetic field such as the magnetic field of the earth. The magnetic field, to be used as an attitude reference, would in this case be generated by celestial body 2. The sensor 5 or 8, for example, would obtain attitude information from the strength of the magnetic field emanating from celestial body 2. During a portion of the orbit there may be interfering electrical storms on the earth, or the reference celestial body, or some galactic disturbances. These would serve to introduce interference in the magnetic sensors and, hence it would be desirable to switch attitude reference to another celestial body whose location with respect to the spacecraft 1 at that time in orbit is known.

FIGURE 1 shows two such bodies 80 and 90 which may be the Moon, Polaris, the Sun or some other well known astronomical reference. This invention would determine interference in the operation of the conventional sensors 5 and 8 or 3 and 4 and automatically switch attitude reference from the primary reference celestial body 2 to a secondary reference celestial body such as 80 or 90. When the interference ceases during another portion of the orbit, the invention then determines this interference free position and the attitude information control is switched back to the primary celestial body 2.

Figure 2:
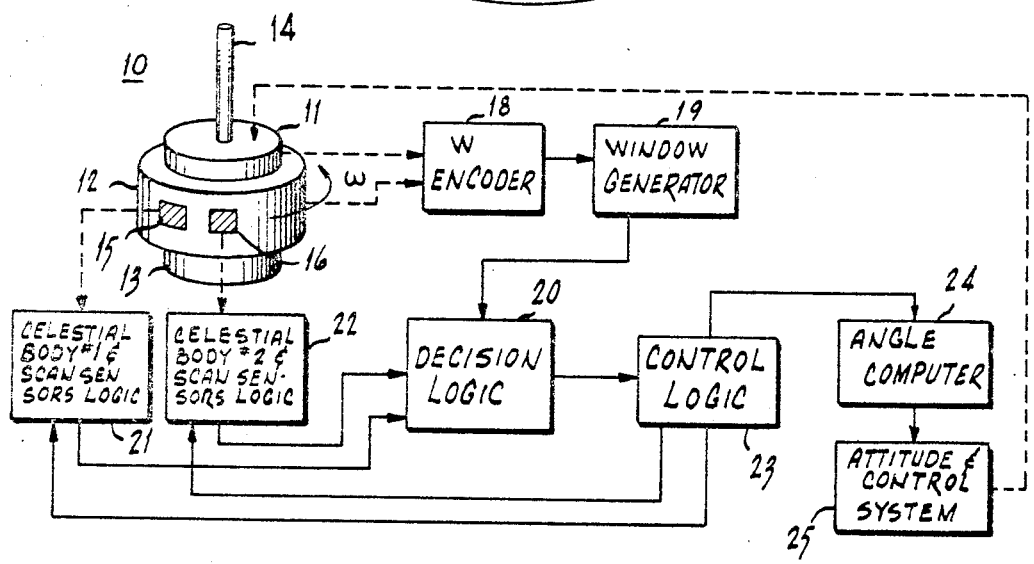
FIGURE 2 is a pictorial view of a spacecraft and a block diagram of the logic employed operating according to this invention.

If reference is made to FIGURE 2 there is shown a space craft 10. The craft 10 is comprised of three cylindrical sections referenced as 11, 12 and 13. The cylindrical configuration of spacecraft 10 presented in the drawing is employed for convenience as the spacecraft or satellites 10 could take on many other geometric forms and still possess attitude problems, and therefore would need equipment described according to this invention. It is common knowledge that when a satellite such as 10 is launched it can be caused to spin in orbit. Section 12 of satellite 10 is caused to spin at an angular velocity $\omega$. Sections 11 and 13 are held fixed in a desired and controllable position with respect to the rotating section 12. In practice sections 11 or 13 may be an antenna platform. The antenna 14 may be a directive antenna and hence the position of its beam has to be carefully directed so that the radiation emanating from antenna 14 is pointed at a desired location at all times. The exact position of the stabilized platform 11 or 13 is controlled by a servo system and the information obtained from the attitude sensors aboard spacecraft 10 is used to orient the platform 11 or 13, depending upon which platform the antenna 14 is mounted, to maintain its position with respect to the rotating portion 12 of the spacecraft 10. Section 12 has mounted thereon a plurality of attitude sensors referenced as 15 and 16. The sensors are shown as two in number for simplicity, but in practice may be greater in number. The sensors 15 and 16 may be radiant energy responding devices such as bolometers, semiconductors, and so on, which provide an output proportional to infrared radiation or light emitted by a reference celestial body. In general the sensors 15 and 16 are similar to those described in conjunction with FIGURE 1. All that is required of the sensors 15 and 16 is that they possess the capability of responding to energy fluctuations emanating from a reference celestial body such as the earth, moon, sun, and so on. The sensors 15 and 16 field of view is controlled by rotating elements such as mirrors and prisms and such elements effectively cause the sensors 15 and 16 to scan a portion of the reference celestial body which may be the horizon or the geometric center. For purposes of illustration, let us assume that the sensors 15 and 16 are bolometers and hence respond to infra-red radiation emanating from a reference celestial body. Numeral 18 represents a velocity encoder having two input terminals shown as two dotted lines, to indicate that the velocity encoder 18 may be mechanically or electrically coupled to the spacecraft 10. One dotted line is coupled to section 12 of the spacecraft 10 and the other is coupled to section 11 of the spacecraft 10. The function of the angular velocity, or the $\omega$ encoder 18, is to generate a signal proportional to the angular velocity of the rotating section 12 with respect to the stabilized platform 11 or 13.

Hence the encoder 18 may be a digital shaft encoder or some other device capable of emitting signals relative to the angular spin velocity of the spacecraft 10. The encoder 18 is coupled to a block referenced by numeral 19 and referred to as the window generator. The function of the window generator 19 is to provide a pulse or pulses related to the time that sensors 15 and 16 are compiling attitude information necessary to stabilize the spacecraft 10. It is during this time that one is concerned with interference that might be present and hence would disturb the normal operation of the sensors 15 and 16. The output of the window generator 19 is coupled to a circuit 20 indicated as decision logic. It is seen that there are two other inputs to circuit 20 from blocks 21 and 22 each of which has an input from an attitude sensor as 15 and 16. The purpose of the decision logic 20 is to determine whether an interfering signal is received and whether the signal is strong enough to cause interference with the anticipated operation of the sensor 15 and 16 and to thereby provide a decision signal which is coupled to the block labelled 23 and referred to as control logic. The decision logic 20 together with the control logic 23 provides a signal which blanks out the sensor as 15 or 16 receiving interference and switches attitude control over to a sensor which is viewing a celestial body in another position. The other body is known to be free from interference in this portion of the orbit and hence can be used. In order to preserve stabilization with respect to the first reference celestial body and to keep the antenna 14 or the platforms 11 and 13 pointed or positioned in the desired direction, there has to be a computation of the difference in position of the second celestial body with respect to the first celestial body. Hence the output from the control logic 23 is coupled to element 24 denoted as the angle computer. The function of the angle computer is to determine the offset between the two reference celestial bodies and compute a signal proportional to their respective locations. This signal will maintain the satellite in attitude stabilization with respect to the desired reference body. The output from the angle computer 24 is coupled to the attitude and control system 25 which serves to maintain the orientation of the satellite 10 in the desired direction. In the above discussion of FIGURE 2 it is noted that all the logic necessary to implement the various blocks of the figure is included aboard the spacecraft 10 and was drawn external to the spacecraft 10 for the sake of clarity and convenience in description.

Figure 3:
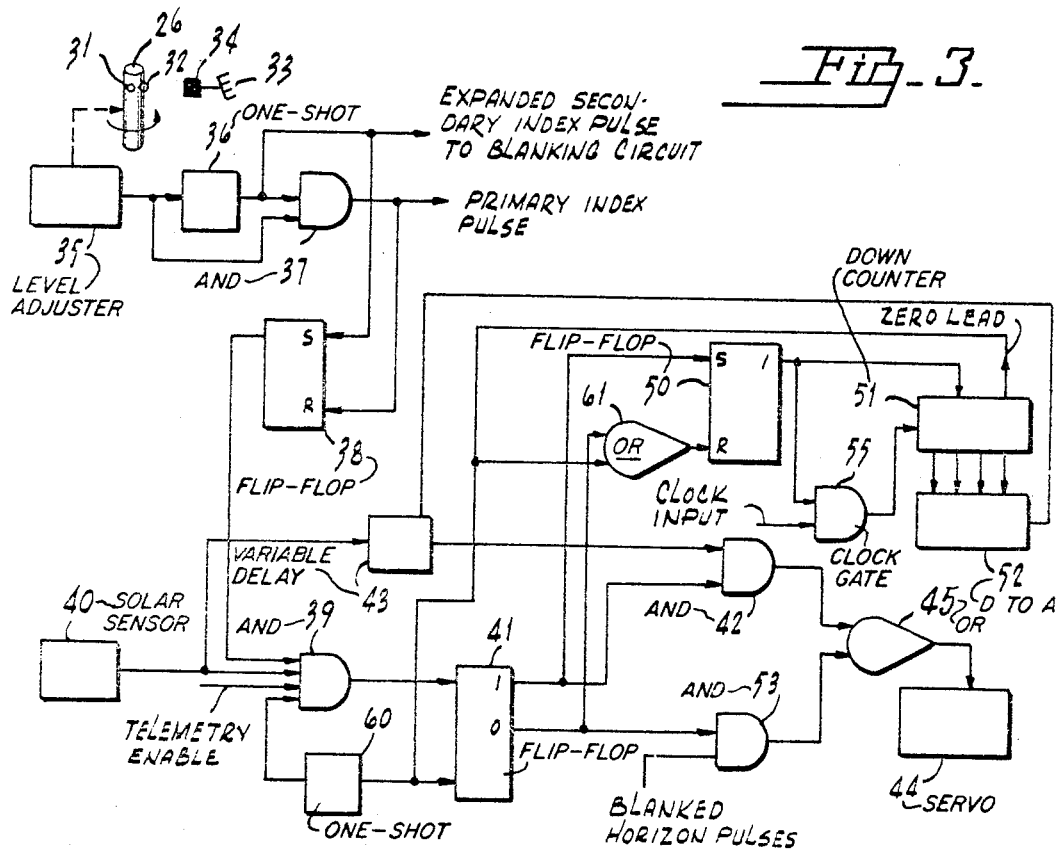
FIGURE 3 is a schematic diagram of an embodiment of the control logic circuitry which may be employed with the subject invention.

If reference is made to FIGURE 3 a specific embodiment of one application of the present invention will be discussed. Numeral 26 represents a rotating shaft which may be the body of a satellite or a section thereof, which is spinning in orbit as previously described. Shown mounted thereon are two devices 31 and 32. The devices 31 and 32 may be magnetic pickup devices or light sensing devices. Shown in the vicinity of the rotating member 26 is a fixed wall 33 or section of spacecraft which may be an antenna platform or some other known stationary member on the spacecraft. Mounted thereon is an element 34. The element 34 may be a magnet or a light source. It can be seen that for each rotation of the shaft 26 there are two pulses or signals, one from each of the elements 31 and 32 mounted on the rotating shaft 26. Hence by using devices of the type described one may obtain a signal or a plurality of signals proportional to the angular velocity of the rotating member 26. It can also be seen that by placing the pickup devices 31 and 32 in particular positions on the rotating shaft 26, any portion of the 360 degrees of rotation may be represented by proper positioning of the pickup devices 31 and 32. There is shown coupled to the shaft 26 and the pickup devices 31 and 32 a level adjusting element 35, the function of which is to take the signals from the pickup devices 31 and 32 and process them so that a pulse or level compatible with existing logic is generated. The function of the rotating shaft 26 and the pickup devices 31 and 32 together with the level adjuster 35 is that which was heretofore described in FIG. 2 as an encoder 18.

The output of the level adjuster 35, for the example shown, would be two pulses for every rotation of the shaft 26 or the satellite. The first of these pulses will be defined as the secondary index pulse and the second pulse is defined as the primary index pulse. The separation of the secondary and primary index pulses determines the length of time attitude sensors aboard the satellite would be viewing a reference celestial body. Coupled to the level adjuster 35 is a one-shot 36, the one-shot 36 triggers once on each secondary pulse and produces at its output a pulse which is longer than the interval between the secondary and primary index pulses. This pulse is defined as the expanded secondary index pulse. The function of this pulse will be described later. The output of the one-shot 36 is coupled to one input of an And gate 37, the other input of the And gate 37 is coupled to the level adjuster 35. Hence the output of the And gate 37 is only the primary index pulse. This is so because the one-shot 36 is made to trigger on the trailing edge of the secondary index pulse. One output from the one-shot 36 is coupled to the set terminal of a flip-flop 38. When the expanded secondary pulse is present the flip-flop 38 is caused to trigger, allowing its output to go high or to an enabling level. At the presence of an output from the And gate 37 which is the primary index pulse the flip-flop 38 is reset. Hence the output of the flip-flop 38 is a pulse whose width represents the angular distance between the two pickup devices 31, 32 and thereby the time between the secondary and primary index pulse. This output from flip-flop 38 is referenced as the window. This window pulse is coupled to And gate 39. Another input to And gate 39 is from a solar sensor 40. The function of the solar sensor 40 is to generate a signal when the sun is in the view of a primary reference sensor and therefore the sun's energy would saturate the primary reference sensor and thereby provide inadequate attitude information. Sensor 40 could also generate a continuous signal but only be used on command of the logic coupled to it. There is also shown as an input to And gate 39 a lead designated as telemetry enable. The function of this lead will be described later. There is also another input to the And gate 39 which for the present together with the telemetry enable lead can be considered to be normally on and hence all that is required for the operation of And gate 39 is the presence of the window pulse, and the pulse from the solar sensor 40 which will be referred to as the sun pulse. When the two pulses, the window pulse and the sun pulse, coincide, flip-flop 41 is triggered. The triggering of flip-flop 41 enables one input of And gate 42. The other input of And gate 42 is coupled to the output of circuit 43 which is a variable delay circuit. The input of the variable delay circuit 43 is coupled to the solar sensor 40. The function of the variable delay circuit 43 is to provide a delay proportional to the position of the interfering source, in this case the sun, which is to temporarily become the secondary reference celestial body and hence replace the primary reference celestial body for purposes of attitude stabilization. The compensation of position is necessary because the satellite or spacecraft upon which this logic is employed is continuously moving in orbit and hence a secondary celestial body appears in different positions with reference to the horizon or some other reference used as the primary reference celestial body. As was shown in FIGURE 1 the satellite will reach a point in orbit where the interfering body will no longer be in view of the attitude sensors. It will be shown that the output from the variable delay circuit 43 represents proper attitude information for the spacecraft, which information would be substantially the same as that obtainable from the reference celestial body were there no interference.

The output of And gate 42 is coupled to an Or gate 45 whose output goes to the servo system 44 which controls the position of an antenna platform or in general a desired portion of a spacecraft with respect to the primary reference celestial body. Flip-flop 41 when triggered also triggers flip-flop 50. When flip-flop 50 fires the output resets a down counter 51 and enables a clock gate 55. The clock gate 55 is a two input And gate. One input of And gate 55 is enabled by flip-flop 50 and the other input, labelled clock input, responds to a train of pulses whose frequency is previously determined to be related to the anticipated known positional displacements of the primary reference celestial body and the secondary reference celestial body. The function of the down counter 51 is to provide a control to the variable delay circuit 43 which enables the variable delay circuit 43 to produce a delay consistent with the actual location of the satellite with respect to the primary celestial body. Down counter 51 is what is commonly referred to as an index down counter. That is, it originally is preset to a specific count, for example 16 or 10,000. It will cycle due to clock pulses and will count down to binary zero, then start over from binary count 15 or 01111, and then start again from binary 14 to zero and so on. Therefore the down counter 51 and the variable delay circuit 43 perform the function of the angle computer as previously described in conjunction with FIGURE 2. If further resolution is desired, the output from the down counter 51 can be coupled to a digital-to-analog converter 52. The function of the digital-to-analog converter 52 would be to produce a unique level for each corresponding binary count. In practice the down counter 51 could be a binary counter or perhaps even a mechanical counter, however, because of weight considerations aboard satellites the preferred embodiment for the down counter 51 would be a transistorized device and therefore a binary or ring type flip-flop counter. From the logic it can be seen that once the solar sensor 40 produces a pulse during the window signal the position control system 44 of the spacecraft is completely under control of the sun pulse and the difference in position of the sun to the normal reference, which in this case would be the primary celestial body's horizon, is automatically cancelled and compensated for by the action of the variable delay circuit 43 and the down counter 51. For reasons of clarity there is shown another And gate 53 which has one input from flip-flop 41 and another input which is labelled blanked horizon pulses. This is included to show that for the portion of the orbit where there is no sun interference, and therefore no sun pulse, the position control system 44 is completely under control of the horizon pulse and consequently, the attitude sensor (not shown in FIG. 3) which is scanning the horizon of the primary reference celestial body. There is also shown a lead coupled to the down counter 51 which is labelled as the zero lead. This lead is activated when the down counter 51 reaches the count of zero and serves to reset flip-flop 50 and flip-flop 41, and at the same time triggers a single shot 60 which serves to inhibit And gate 39. The purpose of the inhibit is to prevent spurious sun pulses which may occur by reflection and disturb the attitude reference when the spacecraft is just at the point of traveling out of the area of interference. The Or gate 61 controls the reset state of flip-flop 50 to ensure that it resets when the down counter reaches zero or that it is reset when flip-flop 41 is reset.

As was mentioned previously, the variable delay circuit 43 together with the down counter 51 and digital-to-analog converter 52 provided the correction to compensate for the positional offset of the sun and the horizon of the reference celestial body. However, a more complicated circuit could be utilized in place of those shown and in general, referred to as a positional offset computer or angle computer whose function would be to compute the quantity proportional to the offset or angle between the first celestial body and any other celestial body which might be utilized as a secondary reference source, whether it be the one causing the interference or one within the satellite's field of view.

Figure 4:
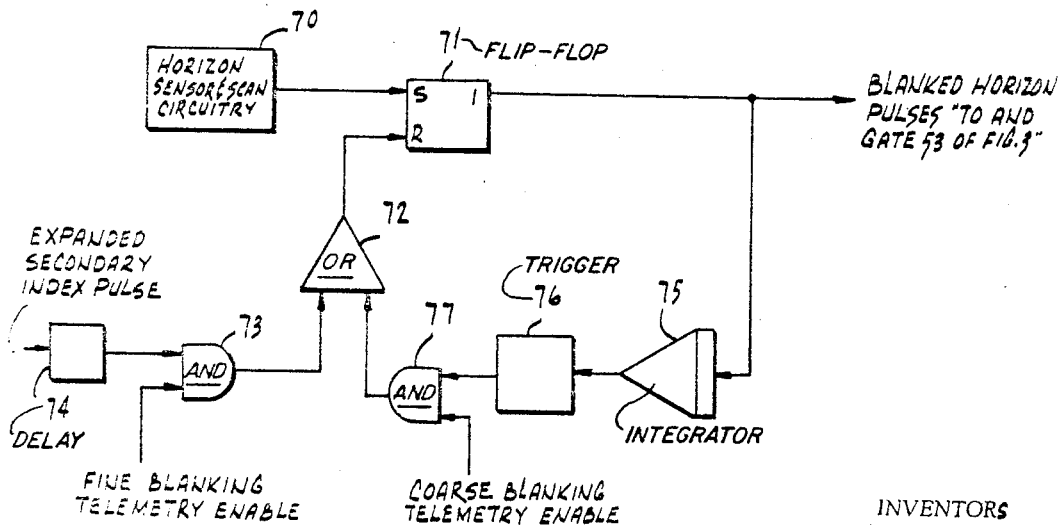
FIGURE 4 is a schematic diagram of the horizon sensor blanking circuitry.

FIGURE 4 shows in schematic form how the blanking of a sensor would be accomplished. Again for the sake of clarity, the example of sun interference and the consequent blanking of a horizon sensor during a portion of a spacecraft's orbit when such a sensor could be saturated by sun interference is continued. Numeral 70 references the horizon sensor and associated scanner circuitry, which contains a thermistor bolometer or other infrared sensing devices, together with means for rotating this device and thereby scanning a portion of a reference celestial body's horizon. Although the terminology horizon sensor and scanner is utilized it could be any device which is sensitive to a detachable form of energy and can therefore be made to operate in the same manner. The output from the horizon sensor and scanner 70 is coupled to the set side of a flip-flop 71. The purpose of the flip-flop 71 is to take the raw horizon pulses from the infra-red detector and to shape them so that a clean level is obtained. The output from the flip-flop 71 is coupled to the input of the And gate 53 in FIGURE 3 and is referred to as blanked horizon pulses. Coupled to the reset side of the flip-flop 71 is an Or gate 72. One input of the Or gate 72 is derived from the circuitry described in FIGURE 3, namely, the expanded secondary index pulse, and the other input is necessary for initial access of the attitude sensing equipment and the described logic aboard the spacecraft. Coupled to the input of the Or gate 72 is an And gate 73. One input to the And gate 73 goes through a delay circuit 74 which may be a resistor-capacitor network, a flip-flop, a one-shot, or any suitable device known in the art capable of giving a finite delay. The pulse that is delayed is the expanded secondary pulse emanating from single shot 36 in FIGURE 2. This delayed pulse serves to reset flip-flop 71 via Or gate 72 and prevents information from the horizon sensor and scanner circuitry 70 from affecting the position control system while the spacecraft is in the area of interference. Also shown as the other input to the And gate 73 is a lead labelled Fine Blanking Telemetry Enable. This lead is normally on and therefore the And gate 73 will respond to the expanded secondary index pulse unless the spacecraft receives a command from the ground station which serves to inactivate the And gate 73 via the FINE BLANKING TELEMETRY ENABLE LEAD. The circuit comprising integrator 75, Schmitt trigger 76, and And gate 77 is used for initial alignment of the primary index pulse and the horizon pulse. This is done when the spacecraft is first placed in orbit and the circuit is completely under control of the ground station. The integrator 75 provides a preset time delay whose value is determined by the knowledge of the diameter of the orbit and the location of the orbit with respect to the primary reference celestial body. When the integrator 75 reaches a certain level, the Schmitt trigger 76 is fired which inhibits flip-flop 71 for a duration which is predetermined to encompass a desired period. The period has been calculated to include both the horizon pulses and the sun pulse. The main reason for this circuit is to prevent a sun pulse or an interfering pulse from disturbing the initial orientation of the spacecraft which is accomplished by telemetry commands and not considered part of this invention as the techniques for initially orienting a vehicle from the ground are well known in the art. The telemetry commands sent from the ground would also serve to inactivate And gate 39 during initial orientation and allow position to be set from earth command.

While there have been described what are presently considered to be the preferred embodiments of this invention, it will be obvious to those skilled in the art that various changes and modifications may be made without departing from the invention, and it is therefore aimed to cover all such changes and modifications as fall within the direct spirit and scope of this invention.

What is claimed is:

1. An attitude control system mounted aboard a spacecraft in orbit about a given celestial body comprising first means including first sensing means effective when enabled for utilizing information from a first reference celestial body sensed by said first sensing means during predetermined time periods for referencing the attitude of said spacecraft, second means including second sensing means effective when enabled for utilizing information from a second reference celestial body sensed by said second sensing means during said predetermined time periods for referencing the attitude of said spacecraft, and control means including decision logic means coupled to said first and second sensing means for normally enabling said first means and disabling said second means and for disabling said first means and enabling said second means in response to the sensing by said first sensing means of an interfering signal during said predetermined time periods.

2. The attitude control system defined in claim 1, wherein said first reference celestial body is said given celestial body.

3. The attitude control system defined in claim 1, wherein said second means includes compensating means for compensating for the positional offset of said second reference celestial body with respect to said first reference celestial body to cause said spacecraft's attitude reference to appear at all times as if it were referenced to said first reference celestial body.

4. The attitude control system defined in claim 1, wherein said spacecraft spins about an axis at a predetermined angular velocity, whereby said first sensing means is in a position to sense information from said first reference celestial body only during a portion of each rotation of said spacecraft about its spin axis, wherein each of said predetermined periods includes said portion of a rotation of said spacecraft about its spin axis, and wherein said second sensing means is displaced from said first sensing mean by an amount such that said second sensing means is in a position to sense information from said second reference celestial body during said predetermined periods.

5. The attitude control system defined in claim 1, wherein said control means further includes means for automatically re-enabling said first means and again disabling said second means a given time following the enabling of said second means, said given time occurring subsequent to the end of a predetermined period.

References Cited
UNITED STATES PATENTS

| | | | |
|---|---|---|---|
| 3,020,407 | 2/1962 | Merlen | 250—833 |
| 3,206,141 | 9/1965 | Drydon | 244—1 |

RALPH G. NILSON, *Primary Examiner.*

M. J. FROME, *Assistant Examiner.*

U.S. Cl. X.R.

250—203; 244—1